US012647453B2

(12) United States Patent
Boucadair et al.

(10) Patent No.: US 12,647,453 B2
(45) Date of Patent: Jun. 2, 2026

(54) METHODS FOR IDENTIFYING AT LEAST ONE SERVER FOR MITIGATING AND PROTECTING A CLIENT DOMAIN AGAINST A COMPUTER ATTACK, CORRESPONDING DEVICES AND SIGNAL

(71) Applicant: ORANGE, Issy-les-moulineaux (FR)

(72) Inventors: Mohamed Boucadair, Chatillon (FR);
Christian Jacquenet, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 23 days.

(21) Appl. No.: 18/721,767

(22) PCT Filed: Dec. 16, 2022

(86) PCT No.: PCT/EP2022/086477
§ 371 (c)(1),
(2) Date: Jun. 19, 2024

(87) PCT Pub. No.: WO2023/117802
PCT Pub. Date: Jun. 29, 2023

(65) Prior Publication Data
US 2025/0047706 A1 Feb. 6, 2025

(30) Foreign Application Priority Data
Dec. 20, 2021 (FR) ..................................... 2113987

(51) Int. Cl.
*H04L 9/40* (2022.01)
(52) U.S. Cl.
CPC ...... *H04L 63/1441* (2013.01); *H04L 63/1416* (2013.01)

(58) Field of Classification Search
CPC ...... H04L 63/1441; H04L 63/14; G06F 21/55
See application file for complete search history.

(56) References Cited

U.S. PATENT DOCUMENTS

| | | | | |
|---|---|---|---|---|
| 9,237,125 | B1* | 1/2016 | Bardgett | ................. H04L 63/02 |
| 2017/0223050 | A1* | 8/2017 | Holloway | ............. G06F 21/577 |
| 2018/0109555 | A1* | 4/2018 | Reddy | ................... G06F 21/554 |

OTHER PUBLICATIONS

Mortensen et al., RFC 8811 DDoS Open Threat Signaling (DOTS) Architecture, Aug. 2020 (Year: 2020).*

(Continued)

*Primary Examiner* — Hieu T Hoang
(74) *Attorney, Agent, or Firm* — David D. Brush; Westman, Champlin & Koehler, P.A.

(57) ABSTRACT

Services for detecting and mitigating computer attacks are proposed by some access providers to their customers. However, sometimes a message to request support for the management of attacks issued by a node of a client domain under computer attack is sent to a mitigation server that is unable to process it. Such a request will be systematically rejected and no mitigation action will be implemented. The present solution makes it possible to ensure that no request message issued by a node goes unanswered, even if it is transmitted to a mitigation server that is unable to process it. To this end, when a mitigation server determines that it is unable to process a request message, instead of rejecting this request, it will seek to identify at least one other mitigation server that would be able to process this request message.

13 Claims, 3 Drawing Sheets

(56) References Cited

OTHER PUBLICATIONS

International Search Report dated Mar. 15, 2023 for corresponding International Application No. PCT/EP2022/086477, filed Dec. 16, 2022.

Written Opinion of the International Searching Authority dated Mar. 15, 2023 for corresponding International Application No. PCT/EP2022/086477, filed Dec. 16, 2022.

English translation of the Written Opinion of the International Searching Authority dated Mar. 15, 2023 for corresponding International Application No. PCT/EP2022/086477, filed Dec. 16, 2022.

K. Nishizuka et al., "RFC 9133 Controlling Filtering Rules Using Distributed Denialof-Service Open Threat Signaling (DOTS) Signal Channel," Internet Engineering Task Force (IETF), Sep. 2021.

M. Boucadair et al., "RFC 9132 Distributed Denial-of-Service Open Threat Signaling (DOTS) Signal Channel Specification," Internet Engineering Task Force (IETF), Sep. 2021.

A. Mortensen et al., "RFC 8811 DDoS Open Threat Signaling (DOTS) Architecture," Internet Engineering Task Force (IETF), Aug. 2020.

"RFC: 793—Transmission Control Protocol—DARPA Internet Program—Protocol Specification," Information Sciences Institute, Sep. 1981.

B. Schwartz et al., "Service binding and parameter specification via the DNS (DNS SVCB and HTTPS RRs) draft-ietf-dnsop-svcb-https-06," DNSOP Working Group, Internet-Draft, Jun. 16, 2021.

* cited by examiner

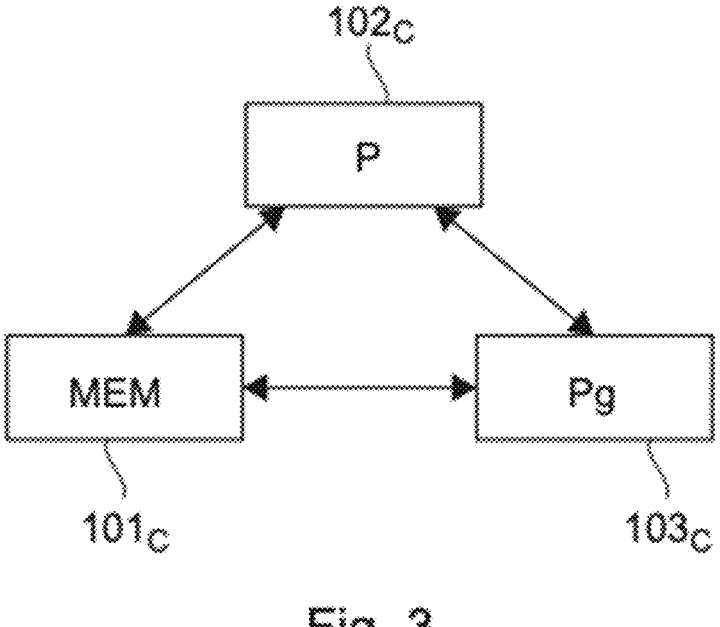
_Fig. 3_
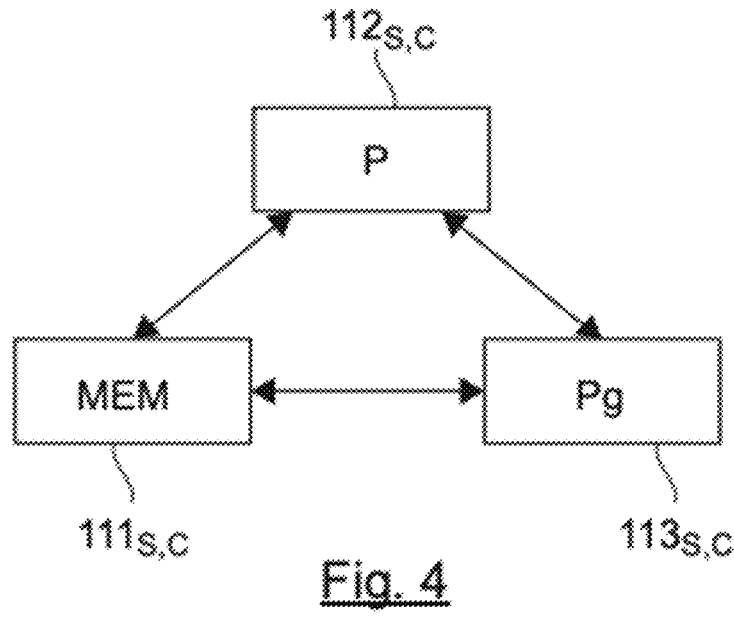
_Fig. 4_

METHODS FOR IDENTIFYING AT LEAST ONE SERVER FOR MITIGATING AND PROTECTING A CLIENT DOMAIN AGAINST A COMPUTER ATTACK, CORRESPONDING DEVICES AND SIGNAL

CROSS-REFERENCE TO RELATED APPLICATIONS

This Application is a Section 371 National Stage Application of International Application No. PCT/EP2022/086477, filed Dec. 16, 2022, and published as WO 2023/117802 A1 on Jun. 29, 2023, not in English, which claims priority to French Patent Application No. 2113987, filed Dec. 20, 2021, the contents of which are hereby incorporated by reference in their entireties.

FIELD OF THE INVENTION

The field of the invention is that of communications established on a network, for example an IP network, and particularly that of added-value IP services.

In particular, the invention has applications in the field of mitigating DDOS (Distributed Denial of Service) attacks, implementing for example, but not exclusively, a DOTS (DDOS Open Threat Signaling) type architecture, as standardized by the IETF, or mitigating intrusion attacks.

More specifically, the invention provides a solution making it possible to facilitate the coordination of mitigation actions taken in order to counter computer attacks affecting a client domain.

PRIOR ART AND ITS DRAWBACKS

As a reminder, a DDOS attack is an attempt to make resources, for example network or computing resources, unavailable for their users. Such attacks can be massively deployed compromising a large number of hosts, and using these hosts to amplify the attacks.

In order to mitigate these DDOS attacks, detection and mitigation services are proposed by some access or service providers to their customers. Such mitigation services (or DPS, for DDOS Protection Services) can be hosted within infrastructures operated by access providers or in the cloud. In particular, they make it possible to distinguish "legitimate" traffic, i.e., data consented to by the user, from "suspicious" traffic.

When a DPS type service is hosted in the cloud, it is difficult to identify a DDOS attack in advance, because the detection components implemented by such a service are not necessarily present on the paths used by the data characteristic of the attack traffic to reach its victim(s).

To solve this problem, it has particularly been proposed to establish tunnels through which the incoming or outgoing traffic of a site or of a network is routed. Such tunnels thus constitute a resource for carrying the traffic that the DPS can then inspect. However, the establishment and the use of tunnels considerably increase the latency observed by the users and impose sizing constraints on the DPS in order to be able to process all incoming or outgoing traffic from all the user terminals of such tunnels. Furthermore, said tunnels are considered as potential attack vectors.

When a DPS type service is hosted within an infrastructure operated by an access provider, even if the DPS is present on the path used by the incoming or outgoing traffic of a network, difficulties may arise in identifying suspicious traffic. In particular, with the increase in encrypted traffic, in particular carried over UDP (User Datagram Protocol) such as for example QUIC traffic, it is difficult to distinguish legitimate traffic from suspicious traffic. The difficulty of accessing unencrypted control messages, similar to the "SYN/SYN-ACK/ACK" messages of the TCP (Transmission Control Protocol) can indeed complicate the verification of the consent of a node of the network to receive traffic, for example.

In order to help identify suspicious traffic, a specific architecture has been standardized within the IETF, called a DOTS architecture. Such an architecture, makes it possible for a client node, known as a DOTS client, to inform a mitigation server, known as a DOTS server, that it has detected a DDOS attack and that appropriate mitigation actions are required.

Thus, when a client domain is the target of a DDOS attack, a DOTS client that is part of this client domain can send a message to a DOTS server to request assistance. The latter coordinates, with a mitigator, the actions to be carried out so that the traffic of the denial of service attack is no longer routed to the client domain, while legitimate traffic continues to be routed normally to the client domain.

The DOTS architecture is based on the use of two communication channels for exchanging signaling messages between a DOTS client and a DOTS server:
- a DOTS Data Channel, and
- a DOTS Signal Channel.

The DOTS data channel can be used when no DDOS attack is detected by a DOTS client, particularly to facilitate the establishment of preventive actions, such as the installation of traffic filters. The data channel can also be used to pre-install filtering rules to be activated during a mitigation (for example, to identify a portion of the traffic that must be eliminated by the mitigation actions). For example, a DOTS client can use this channel to install rules for filtering the traffic received from certain addresses or that intended for a given node, or to request the server to block all the traffic destined for the prefix "1.2.3.0/24" or also all the UDP traffic destined for the port number 443, currently used by the denial of service attacks.

The DOTS signal channel, for its part, is used particularly when a DDOS is in progress. Thus, a DOTS client can use this channel to request assistance with the DOTS server. For example, a DOTS client uses the signal channel to send a mitigation request to the server informing it that the prefix "1.2.3.0/24" is undergoing a DDOS attack, so that the server can take actions to stop the attack. Such a request is associated with a DOTS client identified by a unique identifier from the plurality of active clients of a client domain, noted CUID (Client Unique IDentifier).

If the mitigator is not co-located with the DOTS server, the latter relays the request to a mitigator that can thus take the appropriate mitigation measures to stop a DDOS attack on the one hand, if the request emanating from the DOTS client is not in conflict with other requests emanating from other DOTS clients that are part of the same client domain, or with a filtering rule previously installed by the DOTS server in response to a request from another client of the same client domain, and on the other hand, if the server is authorized/configured to honor the last request received. When the DOTS server is not authorized to process such a request, it rejects it and issues a 4.03 (Bad Request) error message.

Consequently, there is a risk that a DOTS server refuses to process signaling messages coming from a DOTS client, such as for example an attack mitigation request issued by a DOTS client while the attack is real, or filtering requests issued by a DOTS client (one purpose of the filtering requests being to anticipate DDOS attacks). In particular, such a refusal may occur when the client domain uses an "anycast" address to join a DOTS server or in the event of failure of an algorithm making it possible to identify output equipment of the client domain, for example. An "anycast" address is an address configured with a plurality of network interfaces and that therefore makes it possible to join a plurality of equipment. Thus, a data packet having for destination an "anycast" address will be processed by a single item of equipment having been configured with this address, but that is the closest to the source issuing the packet within the meaning of the dynamic routing policy implemented within the network.

In such scenarios, a request issued by a DOTS client of the client domain can be sent to a DOTS server that is not authorized to process it. Such a request will then be systematically rejected by said DOTS server and no mitigation action will be able to be implemented, regardless of whether preventively or correctively to mitigate an attack detected.

There is therefore a need for a novel technique that makes it possible to improve the coordination of the mitigation actions taken in order to counter attacks affecting or likely to affect a client domain.

DISCLOSURE OF THE INVENTION

The invention meets this need by proposing a method for identifying at least one attack mitigation server authorized to protect a client domain against a computer attack.

Such a method is particular in that it is implemented by a first attack mitigation server and that it comprises:

receiving a message to request support for the management of attacks coming from a client node of the client domain; and when said first mitigation server is unable to process said request message:

obtaining, by means of at least one first identifier of said client domain obtained by the first mitigation server, at least one information for identifying at least one second attack mitigation server authorized to process said request message.

Such a solution, designated in the following description by LOST (Liberal processing of ddos mitigation requeSTs), makes it possible to ensure that no message to request support for the management of attacks (e.g., request to mitigate attacks or to establish filtering rules) issued by a client node does not remain unanswered even it if it is transmitted to a mitigation server unable to process it.

No limitation is related to the nature of the request message. It may concern for example, in the context of a DOTS architecture such as previously cited, any one of the signaling messages mentioned above, such as a request message sent via the signal channel (e.g., a mitigation request) or a request message sent via the data channel (e.g., a filtering request). Moreover, it is noted that although the invention has been introduced with reference to the DOTS architecture, it also applies to other architectures designed for exchanging between various signaling message entities in connection with the management of attack traffic (preventive and/or corrective management) such as that for example of architectures operating signaling based on the NETCONF protocol or also other proprietary architectures designed for this purpose. In addition, the solution applies independently of the internal architecture of the DDOS protection service. Particularly, the solution applies if the mitigation actions are undertaken directly by the mitigation server having received the request message or by an external entity (typically, mitigator) to which the request message has been relayed by said mitigation server.

The inability of a mitigation server to process such a request message may have various causes.

Thus, in a particular embodiment, a mitigation server is unable to process a request message issued by the client node (e.g., an attack request message), because it does not have necessary authorizations to do so. This is the case, for example, when the mitigation server is not authorized to apply certain policies relating to resources (e.g., IP, URI, FQDN prefixes) of the client domain such as traffic routing, filtering or redirection policies, etc. In other words, in this embodiment, the inability of the mitigation server to process the request message issued by the client node comes from the fact that it is not authorized to process this request message.

In another embodiment, a mitigation server is unable to process a request message issued by the client node (e.g., an attack mitigation request) because it neither has the structural (e.g., computing capacities, network resources) and/or functional resources to do so, nor an interface with an entity having such resources (e.g., mitigator mentioned above). In the remainder of the description, such a mitigation server is designated as being not capable of processing the request message issued by the client node.

In another embodiment, the focus is on the two conditions mentioned above (authorization and capability) for determining whether a mitigation server is or is not able to process a request message. In other words, in this other embodiment, a mitigation server able to process a message to request support for the management of attacks within the meaning of the invention is on the one hand, authorized to do so, and on the other hand, has the structural (e.g., hardware, software, etc.) and functional resources to do so or an interface with an external entity (e.g., mitigator) having such resources.

In accordance with the invention, when a first mitigation server determines that it is unable to process an attack request message, that is to say according to the embodiment considered, because it is not authorized to do so and/or because it is not capable of doing so (directly or indirectly via an interface with an external entity responsible for developing and/or implementing a mitigation plan), it seeks to identify a second mitigation server authorized to process the attack request message that it receives.

Indeed, in the present case, when the first mitigation server determines that it is unable to process a request message, that is to say, for example, that it is not authorized to process this request, instead of rejecting this request, it will seek to identify at least one other mitigation server that would be able to process this request message. This other mitigation server may in turn implement the present method recursively until a mitigation server effectively able to process the request message is identified.

For this, the mitigation server uses at least one identifier of the client domain targeted by the attack (first identifier within the meaning of the invention). This identifier is created especially to make such an identification of another mitigation server possible. This new identifier of the client domain is associated with at least one DDOS protection service protecting resources of the client domain (for example, a DPS for DDOS type attacks) and makes it possible to make the connection between the client domain and at least one attack mitigation server implementing said at least one DDOS protection service and authorized to process a request message issued by a client node of the client domain in question.

Such an identifier of the client domain to which the client node having issued the request message is attached may be shared by a plurality of DDOS protection services (e.g., a plurality of DPS), for example by a plurality of DDos protection services provided by the same administrative entity. In another example, an identifier of the client domain to which the client node having issued the request message is attached may be specific to a DDOS protection service (e.g., to a DPS) implemented, for example by the second mitigation server and, consequently, will not be recognized by another DDOS protection service implemented, for example by a third mitigation server. In yet another example, an identifier of the client domain may be specific to a mitigation server contributing to implementing a DDOS protection service.

The first mitigation server having implemented the present solution then finds itself in possession of data making it possible to process the request message that it has received but that it cannot process, thus preventing the latter from remaining unanswered, such processing being carried out by another mitigation server (second mitigation server within the meaning of the invention).

In one example, at least one said first identifier of said client domain is obtained by querying a first database by means of a domain name associated with said client domain.

In such an example, a first database maintains a registry wherein a domain name associated with the client domain of the client node having issued the request message is associated with at least one identifier of said client domain. Such a first database is for example maintained by a DNS (Domain Name System) server.

In another example, at least one said first identifier of said client domain is extracted from said request message.

In this example, the first identifier in question of said client domain is conveyed in a field of the request message. Thus, the first mitigation server simply needs to extract this information from the request message.

In one implementation of the present method, at least one said first identifier of said client domain can be obtained by the first mitigation server by means of a second identifier of said client domain extracted from the request message.

This embodiment has a preferred application when the request message comprises a second identifier of the client domain shared by a plurality of mitigation servers or DDOS protection services (that is to say that identifies a plurality of mitigation servers/DDOS protection services), of which the first mitigation server having received the request message, and when the first mitigation server is not able to process this message. Indeed, it is important to be able to identify another mitigation server authorized to process it.

In this situation, the first mitigation server can use the second identifier extracted from the request message to obtain a domain name associated with said client domain. Then, from this domain name it can, for example by querying the first database, obtain one or more identifiers of the client domain associated with the domain name obtained (first identifiers within the meaning of the invention), and from these identifiers of the client domain, identify one or more mitigation servers authorized to process the request message. The choice of the mitigation server(s) to which the request message is oriented for processing may depend on various parameters (migration policy, existing agreements with the client domain and/or between the protection services, etc.)

In one alternative embodiment, when the request message comprises an identifier of the client domain shared with a plurality of mitigation servers or DDOS protection services of which the first mitigation server having received the request message, and when the first mitigation server is not able to process this message, it uses this identifier of the client domain to identify the other mitigation servers authorized to process the signaling message.

In one example, the method further comprises a step of obtaining at least one information for locating said second mitigation server by querying a second database by means of said first identifier of said client domain.

Such information for locating said second mitigation server may comprise at least one network address of said second mitigation server and/or at least one port number of said second mitigation server.

Thus, it is possible to contact this second mitigation server in order to inform it of the occurrence of an attack having for target resources of the client domain.

In one example, the information for identifying and/or locating said second server is transmitted by the first server to the client node.

Thus upon receipt of this information, the client node can issue a new request message directly to the second server.

In another example, the first mitigation server acts as a relay for the client node by transmitting the request message to the second server. The advantage of this second alternative embodiment is to reduce the delay in processing the request message.

The invention also relates to a method for protecting a client domain against a computer attack, said method being implemented by a client node hosted by the client domain and comprising:

transmitting a message to request support for the management of attacks to a first attack mitigation server;

receiving at least one information for identifying at least one second attack mitigation server authorized to process said request message, the first and the second attack mitigation server being associated with distinct mitigation services; and transmitting said request message to said second mitigation server.

The distinct DDOS protection services can for example be managed by distinct administrative entities.

In one example, the request message comprises at least one identifier of said client domain by means of which said at least one information for identifying said second mitigation server is obtained by the first mitigation server.

The invention also relates to an attack mitigation server, known as first mitigation server, authorized to protect a client domain against a computer attack, and comprising at least one processor configured to:

receive a message to request support for the management of attacks coming from a client node of the client domain; and when said first mitigation server is unable to process said request message:

obtain, by means of an identifier of said client domain obtained by the first mitigation server, at least one information for identifying at least one second attack mitigation server authorized to process said request message.

Another object of the invention relates to a client node hosted by a client domain comprising at least one processor configured to:

transmit a message to request support for the management of attacks to a first attack mitigation server;

receive at least one information for identifying at least one second attack mitigation server authorized to process said request message, the first and the second attack mitigation server being associated with distinct DDOS protection services; and transmit said request message to said second mitigation server.

The invention also relates to a signal intended to be transmitted by a client node hosted by a client domain to at least one first attack mitigation server, said signal comprising a message to request support for the management of attacks, said request message comprising at least one identifier of said client domain by means of which information for identifying at least one second mitigation server authorized to process said request message may be obtained.

Finally, the invention relates to computer program products comprising program code instructions for implementing methods as previously described, when they are executed by a processor.

The invention further relates to a computer-readable recording medium on which are recorded computer programs comprising program code instructions for executing the steps of the methods according to the invention as described above.

Such a recording medium may consist of any entity or device able to store the programs. For example, the medium can include a storage means, such as a ROM, for example a CD-ROM or a ROM of a microelectronics circuit, or also a magnetic storage means, for example a flash drive or a hard drive.

On the other hand, such a recording medium can be a transmittable medium such as an electric or optical signal, which can be carried via an electric or optical cable, by radio waves, or by other means, such that the computer programs contained therein can be executed remotely. The programs according to the invention may in particular be downloaded on a network, for example the Internet network.

Alternatively, the recording medium can be an integrated circuit into which the programs are incorporated, the circuit being suitable for executing or for use in the execution of the aforementioned methods of the invention.

BRIEF DESCRIPTION OF THE DRAWINGS

Other aims, features and advantages of the invention will become more apparent upon reading the following description, given simply by way of an illustrative non-limiting example, in relation to the figures, wherein:

FIG. 3: this figure represents the simplified structure of a client node according to one of the embodiments of the present invention, FIG. 4: this figure represents the simplified structure of a mitigation server according to one of the embodiments described above.

DETAILED DESCRIPTION OF EMBODIMENTS OF THE INVENTION

Figure 1:
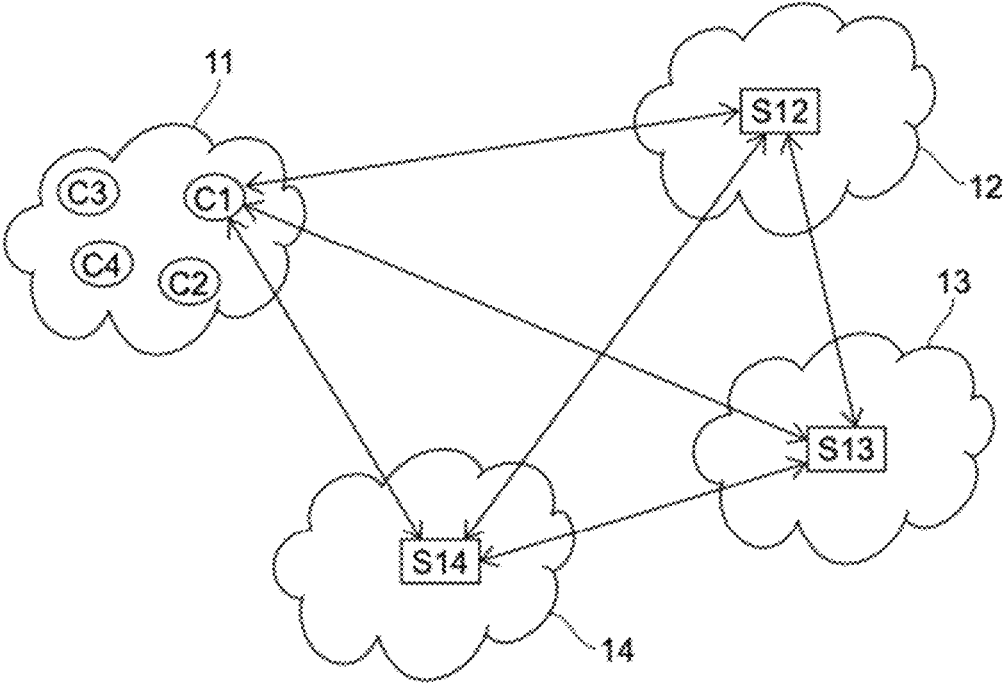
FIG. 1: this figure represents various equipment of a communication network implementing a method for identifying at least one mitigation server according to one embodiment of the invention.

The general principle of the invention is based on the ability of an attack mitigation server to determine that it is unable to process a message to request support in the management of attacks, such as a request to mitigate an attack issued by a client node of a client domain which is the target of an ongoing attack or a filtering request to be activated in the event of a proven attack, etc. To this end, the mitigation server relies on information which is local (e.g., the authorizations pre-configured by an administrator) or retrieved via dedicated interfaces from external entities (e.g., to an external mitigator, a database). These interfaces are for example similar or identical to those of FIG. 1 of the document RFC 8811 published by the IETF and entitled "DDos Open Threat Signaling (DOTS) Architecture", August 2020.

In one implementation of the present solution, a DOTS architecture such as introduced above is considered. Such a request message may be, in this context, a DOTS request. Such a DOTS request may be for example:

a message for managing aliases, for example intended to associate an identifier with one or more network resources located in the client domain, a message for managing filtering rules such as requesting a DOTS server to install an ACL (Access Control List), a signaling message to request the mitigation of a denial of service attack with a DOTS server, the mitigation server being able, upon receipt of such a message, to trigger the necessary actions to stop the attack (including the coordination with an external entity such as a mitigator), a signaling message to control a pre-installed filter as described in the RFC9133.

If said mitigation server is unable to process the request message received, it will then seek to identify at least one other mitigation server that would be able to process this request message instead of rejecting the request in question. Thus, it is ensured that any request message issued by a client node of a client domain is processed.

The inability of a mitigation server to process such a request message may have various causes. In the particular implementation described in detail here, it is considered that the mitigation server is unable to process a request message issued by the client node (e.g., an attack request message), because it does not have the necessary authorizations to do so. This is the case, for example, when the mitigation server is not authorized to apply certain policies relating to resources of the client domain such as traffic routing, filtering or redirection policies, etc. It is then said that the mitigation server is not authorized to process the request message issued by the client node.

In another implementation, a mitigation server may be unable to process a request message issued by the client node (e.g., an attack mitigation request) because said server and/or the entities to be applied in the establishment of mitigation actions do not have the structural (e.g., the computing capacities, the network resources) and/or functional resources to do so. Such a mitigation server is then designated as being not capable of processing the request message issued by the client node.

In yet another implementation, a mitigation server may be unable to process a request message issued by the client node either because it is not authorized to do so, or because it is not capable of doing so. Conversely, in this implementation, a mitigation server able to process a message to request support for the management of attacks within the meaning of the invention is on the one hand, authorized to do so, and on the other hand, has the structural (e.g., hardware, software, etc.) and functional resources to do so.

In accordance with the invention, when a first mitigation server determines that it is unable to process a request message, for example here because it is not authorized to do so, it seeks to identify a second mitigation server authorized to process the request message that it has received.

In relation to FIG. 1, various equipment of a communication network implementing a method for identifying at least one mitigation server according to one embodiment of the invention is presented.

A first client domain 11 comprising one or more machines (computer devices), also called nodes is considered. Here, "domain" means a set of machines or nodes placed under the responsibility of the same administrative entity. The client domain 11 comprises for example a plurality of client nodes C1, C2, C3 and Cm, m designating an integer greater than or equal to 1, communicating with a first mitigation server S12.

The first mitigation server S12 belongs to a first server domain 12, whereas a second mitigation server S13 belongs to a second server domain 13 and a third mitigation server S14 belongs to a third server domain 14. Each of these server domains 12, 13, 14 contributes to implementing a DPS particularly making it possible to distinguish "legitimate" traffic", i.e., data consented to by the user, from "suspicious" traffic. In the embodiment described here, it is considered that the server domains 12, 13 and 14 are managed by distinct administrative entities. However, alternatively, they may be managed by the same administrative entity. Moreover, for the purposes of simplification here, only one mitigation server associated with each DPS and with each server domain is considered. However, alternatively it is possible to consider a plurality of mitigation servers for each server domain, these being able to be configured to protect distinct resources or shared resources of the client domain 11.

A DPS can be hosted within infrastructures operated by the access providers or in the cloud.

Thus, a client domain, such as the client domain 11 interfaces with one or more server domains 12, 13. By language misuse, it will be said that a client domain such as the client domain 11 interfaces with a plurality of DPS.

The detection of an attack, such as a DDOS attack, within a client domain such as the client domain 11, may be carried out by a DOTS client node of the client domain concerned by the attack, such as the client node C1, or by means of a dedicated function, called DDOS Detector, or both. Generally, one or more DDOS detectors can be activated within the same DOTS client domain. In the following, no assumption is made as regards to the internal architecture of a client domain or to the DDOS detection mechanisms implemented within the domain.

Finally, the present solution can be implemented independently of the nature of the network infrastructures used by the components (clients, servers) of a DOTS architecture: these networks may be IP networks, mobile networks (5G, B5G, 6G), etc.

Examples of implementation of the invention in a DOTS type architecture are described below, according to which the client nodes C1, C2, C3 and Cm are DOTS clients and the mitigation servers S12, S13, S14 are DOTS servers. The client nodes C1, C2, C3, Cm and the servers S12, S13, S14 can thus communicate via DOTS signal and/or data channels defined in relation to the prior art, in order to inform the servers S12, S13, S14 by means of DOTS requests as previously described that protection actions are required, such as for example, the mitigation of attacks or the establishment of filtering rules. Although described in relation to a DOTS architecture, the present solution can be implemented within the scope of other types of architectures, such as for example proprietary architectures or architectures operating a signaling based on the NETCONF protocol. Moreover, it applies to attacks other than DDOS attacks, such as for example intrusion attacks.

A DOTS domain can host one or more DOTS clients. In other terms, a plurality of client nodes of a client domain can have DOTS functions.

The DOTS communication between a client domain and a mitigation server may be direct, or established via DOTS gateways. These gateways can be hosted within the client domain, the domain of the mitigation server, or both. In other terms, a client node of the client domain can communicate directly with the mitigation server, or transmit a request to a gateway of the client domain that communicates directly with the mitigation server or with a gateway of the domain of the mitigation server, or transmit a request to a gateway of the domain of the mitigation server that communicates with the mitigation server. It should be noted that a DOTS server located in a client domain is considered by a DOTS server as a DOTS client.

A DOTS gateway located in a server domain is considered by a DOTS client as a DOTS server. In the event of the presence of a DOTS gateway in the domain of the mitigation server, the authentication of DOTS clients can be entrusted to the DOTS gateway of the domain of the mitigation server. A DOTS server can be configured with a list of trusted DOTS gateways, active within its domain and the mitigation server can delegate some of its functions to these trusted gateways. In particular, the mitigation server can securely use the information provided by a gateway figuring in a list declared with the mitigation server and maintained by it, by way of an ad hoc authentication procedure (for example, explicit configuration of the list by the authorized administrator of the mitigation server, retrieval of the list from an authentication server such as an AAA (Authentication, Authorization and Accounting) server, etc.).

The embodiments of the present solution presented below may be implemented regardless of the configuration of the DOTS architecture (one or more DOTS clients in a client domain, no DOTS gateways, one or more DOTS gateways in the client domain or in the domain of the mitigation server, distinct client domain of the domain of the mitigation server, etc.).

In the present solution, it is assumed that each DOTS client domain, such as the client domain 11, has at least one identifier called for example here "DOTS Administrative Domain Identifier" or DADI, globally allocated to the DOTS client domain, and defined for the needs of the invention. This DADI reflects the fact that the client domain is protected by at least one DPS and makes it possible to identify said at least one DPS associated with the client domain. The same client domain 11 may have one or more DADIs, DADI-11$_i$.

Such a DADI therefore makes the connection between a client domain, such as the client domain 11, and at least one DPS that may be implemented in order to assist the client nodes of the client domain considered in the event of an attack. Such a connection is subsequently used to identify at least one mitigation server implementing the DPS in question, and able to process the request message. As mentioned above, in the particular implementation described here, a mitigation server able to process a request message is a server authorized to do so (in other words that has the necessary authorizations for processing this request message). In an alternative implementation, a mitigation server able to process a request message is not only authorized to do so but also has the necessary resources for processing this message or for interfacing with an external entity (e.g., mitigator) capable of processing it.

The same DADI can be used to identify a plurality of DPS associated with the same client domain. A client domain may have resources (e.g., IP prefixes under the surveillance of client nodes) managed (protected) by a first mitigation server implementing a first DPS and other resources managed by a second mitigation server implementing a second DPS. The same DADI can then be used for the communications with distinct mitigation servers. The first and the second DPS are for example managed by distinct administrative entities. However, alternatively, they may be managed by the same administrative entity.

It should be noted that a DADI makes it possible, as opposed to other known identifiers such as the CUIDs and CDIDs, to identify a client domain and not a client node. The use of a client domain identifier makes it possible to ensure that regardless of the client node (of the client domain) at the origin of the issuance of the request message, it is issued to a mitigation server which, failing being able to process it, will implement the present solution making it possible to identify a mitigation server authorized to process the request message.

This is not the case if an identifier of a client node is used. Indeed, client nodes belonging to the same client domain may be managed by different mitigation servers. If this is limited to the use of an identifier of a client node, another mitigation server will not be able to process the request message because it is not authorized to do so and thus the request message will remain unanswered.

In addition, such a CDID cannot be used to identify another authorized mitigation server because this CDID is generated based on a hash of a certificate of the client node used to authenticate the latter with a given mitigation server. As this hash is specific to this association, it therefore cannot be reused for other purposes.

A DADI may be allocated to a client domain by a DPS provider. In such a scenario, it is ensured that the identification spaces used by various DPS providers do not overlap, for example by coordinating the allocation of DADIs between the DPS providers or by using a hierarchical identification space (e.g., the DADI contains a portion that is unique to each DPS provider). In this way, it is ensured that each DADI is globally unique (that is to say on all of the client domains considered). Indeed, for the needs of the present solution, it is important that a DADI unambiguously identifies a given client domain and thus makes it possible to establish a link with the DPS responsible for protecting this client domain.

In another example, to ensure this global uniqueness, the DADIs can be allocated to the client domains by an independent entity, such as the IANA (Internet Assigned Numbers Authority). The involvement of such an independent authority makes it possible to ensure that there is no overlap between the various DADIs allocated to the client domains.

In one example, the same DADI, DADI-$11_1$, associated (that is to say allocated) to the client domain 11, can be used by a plurality of DPS. In another example, a DADI, DADI-$11_2$, associated with the client domain 11 is specific to a second service DPS2 implemented, for example by the mitigation server S13 and, consequently, is not recognized by a first service DPS1 implemented, for example by the mitigation server S12 or also by a third service DPS3 implemented, for example by the mitigation server S14. For example, the client domain 11 has a DADI, DADI-$11_3$, specific to the third service DPS3.

In the embodiment described here, all of the DADIs allocated to various DOTS client domains are maintained in a first DADI registry accessible to a plurality of DPS (and to the mitigation servers contributing to implementing these DPS). This first registry establishes a correspondence between client domain names and the DADIs allocated to the client domains associated with these client domain names. Thus, an entry of such a register may appears in the following way:

TABLE 1

| Client domain names | DADI |
|---|---|
| dots-client-domain11.example.com | DADI-$11_1$ |
| dots-client-domain11.example.com | DADI-$11_2$ |
| dots-client-domain11.example.com | DADI-$11_3$ |
| dots-client-domainij.example.com | DADI-$ij_1$ |
| dots-client-domainkl.example.com | DADI-$kl_1$ | where the integers "ij" and "kl" respectively refer to "ij" and "kl" client domains.

Such a first DADI registry may for example be stored in a DNS registry. As such DNS registries are, in general, already deployed in a network, it is advantageous to use them to store information relating to these DADIs. Indeed, as these DNS registries are known by various nodes of the client domains, their querying by the client nodes is easy. Of course, other types of registries may be considered for storing the first DADI registry (e.g., SQL (Structured Query Language) database or LDAP (Lightweight Directory Access Protocol)).

Furthermore, the first DADI registry may be private, that is to say that the access to the data that it maintains is restricted, or public, that is to say that the access to the data that it maintains is open. The use of a private or public DADI registry is an engineering decision. However, it should be noted that the use of a public DADI registry may give access to sensitive information, for example, the absence of an entry in the DADI registry for a given client domain may indicate that this domain is not protected against attacks. This information may be exploited by attackers against the client domains concerned.

When the first DADI registry is a DNS registry, DNS SVCB type entries, such as defined in the document I-D.ietf-dnsop-svcb-https, can be used to associate a DOTS client domain name, such as the client domain 11, with its DADIs, DADI-$11_1$, DADI-$11_2$, DADI-$11_3$. The choice of using this type of entry is based on the fact that, the DNS SVCB entries comprising a plurality of service parameters, it is thus possible to use one of these service parameters to store therein the DADI of a client domain. It is then not necessary to create new entry types.

In a known manner, the service parameters of a DNS SVCB entry are called SvcParams (Service Parameters), and each of these service parameters is characterized by a key (SvcParamKey) and a value (Value). In the embodiment described here, it is therefore proposed to define a new service parameter corresponding to a "SvcParamKey" key that here is called "dadi" by way of illustration, and upgraded with the list of DADIs associated with the client domain 11 namely DADI-$11_1$, DADI-$11_2$ and DADI-$11_3$.

An example of a request for creating a DNS SVCB type entry in the first DADI registry associating the client domain 11 "dots-client.example.com" with the identifier DADI-$11_1$, the value of which is "4572sd174sf1", appears as follows: _dots-client.example.com. 7200 IN SVCB 1 alpn=dots dadi=4572sd174sf1 simple.example.

Upon receipt of a DNS request of the SVCB type issued by a mitigation server in order to obtain the DADI(s) associated with the client domain 11, the first DADI registry returns the DADIs associated with the client domain 11.

At the same time, the various DPS providers operating the mitigation servers S12, S13, S14, according to the present solution maintain a second DADI registry, known as DPS_Active_DADI, of which each entry associates one or more DADIs associated with a DOTS client domain, such as the client domain 11, with data relating to one or more mitigation servers implementing a DPS. This second DPS_Active_DADI registry may appear as follows:

TABLE 2

| DADI | DPS_Contact_Point |
|---|---|
| DADI-11$_1$ | DPS_Contact_PointS12 (domain-name12, @IP12, port 1) |
| DADI-11$_2$ | DPS_Contact_PointS13 (domain-name13, @IP13, port 2) |
| DADI-11$_3$ | DPS_Contact_PointS14(domain-name14, @IP14, port 3) |

This second DPS_Active_DADI registry may also be stored in a DNS type registry. Of course, other types of registries can be considered such as, for example, a LDAP directory or a SQL database as previously cited.

Each DPS provider carries out, for the DPS that it provides, the addition or the deletion of entries in this second DPS_Active_DADI registry according to agreements made with the various DOTS client domains for which they are authorized to mitigate attacks and protect resources. Dedicated API (Application Programming Interfaces) can be used for this purpose.

An example of creation of an entry in the DPS_Active_DADI registry is described below. A primitive used for adding an entry to the DPS_Active_DADI registry is called REGISTER (dadi). Such a primitive indicates that one or more DADIs are associated with one or more mitigation servers identified by a set of DPS_Contact_Point parameters that may particularly comprise here, identification information such as a domain name, location information such as one or more IP addresses, one or more port numbers, as well as other information such as for example a validity period for the record, etc.

Likewise, a primitive used to delete an entry in said DPS_Active_DADI registry is called DELETE (dadi). This primitive is used for example to delete a record when a client domain no longer uses the DDOS protection services of a given DPS provider.

In one example of implementation, the REGISTER and DELETE primitives are authenticated in order to ensure that a DPS provider is authorized to carry out an operation relating to a DADI in the DPS_Active_DADI registry.

Figure 2:
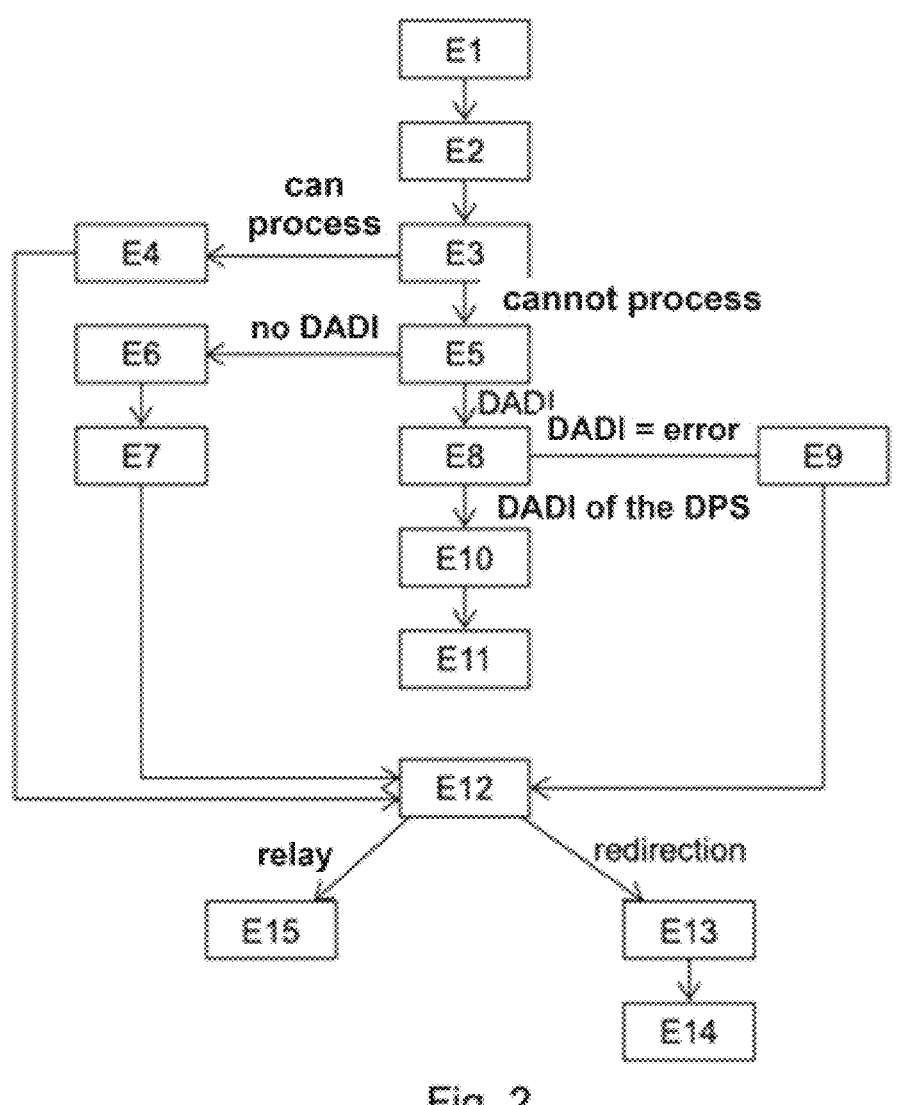
FIG. 2: this figure represents the main steps of the methods for identifying at least one server for mitigating and protecting a client domain against a computer attack subject matter of the present solution.

FIG. 2 illustrates the main steps of the methods for identifying at least one server for mitigating and protecting a client domain against a computer attack subject matter of the present solution.

Thus, in a step E1, a client node C1 of the client domain 11 detects an attack targeting all or part of the resources of the client domain 11, in a manner known per se and not described here. Such an attack may not yet have affected the client domain 11.

In order to mitigate this attack, the client node C1 issues, in a step E2, a message to request support in the management of attacks to a first DOTS mitigation server, for example here the mitigation server S12, in order to signal the attack of which it is the target and request the execution of a DDOS protection service ("Request Mitigation") in order to process this attack. A request message is for example a DOTS request.

The client node C1 inserts a new DOTS parameter here called "dadi" into the "Request Mitigation" request message, and more particularly into a header of this request message. This new "dadi" parameter, inserted for the needs of the present solution, comprises the DADI(s) DADI-11$_1$, DADI-11$_2$ and DADI-11$_3$ associated with the client domain 11 to which the client node C1 belongs.

An example of headers of such a request message modified in accordance with the present solution is provided below, for the illustrative example of the identifier DADI-11$_1$ previously considered and having the value "4572sd174sf1":

```
Header: PUT (Code=0.03)
Uri-Host: "www.example.com"
Uri-Path: ".well-known"
Uri-Path: "dots"
Uri-Path: "mitigate"
Uri-Path: "cuid=mydotsclient"
Uri-Path: "mid=57956"
Uri-Path: "dadi=4572sd174sf1"
Content-Format: "application/cbor"
```

When the request message comprises a plurality of DADIs, the latter can be separated by means of a separator such as for example ";" between the identifiers (e.g., dadi=DADI-11$_1$; DADI-11$_2$; DADI-11$_3$), or the argument is repeated (e.g., Uri-Path: "dadi=DADI-11$_1$", Uri-Path: "dadi=DADI-11$_2$", Uri-Path: "dadi=DADI-11$_3$"). This last possibility is less interesting because it increases the size of the request message (and therefore the risk of fragmentation of the message).

The various headers of the request message shown above are defined in the document RFC9132 published by the IETF (Internet Engineering Task Force). Thus, one of the headers "Uri-Path", comprises, within the scope of the implementation of this present solution, the value "4572sd174sf1" of the DADI, DADI-11$_1$, associated with the client domain 11.

Alternatively, the DADI(s) is/are inserted into the body of the "Request Mitigation" request message (e.g., the PUT or POST messages).

According to another alternative embodiment, which may be used alternatively to what has just been described or additionally, in order to ensure that the various mitigation servers receiving the "Request Mitigation" request message can have access to a value of the "dadi" DOTS parameter (for example, the "Request Mitigation" request has been routed to a DOTS server that is not able to decrypt it), the client node C1 can insert a UDP or TCP option, according to the transmission protocol used to send the "Request Mitigation" request message. An example of format of such an option is in accordance with the format documented in the publication RFC793 of the IETF.

Upon receipt of the "Request Mitigation" request message, the mitigation server S12 determines, during a step E3, whether it is able to process this message, that is to say in the particular implementation considered here, whether it is authorized to do so. This determination can be performed by means known by the person skilled in the art and not described in detail here.

If the server S12 is able (i.e., here authorized) to process the request message, then it informs the client node C1 that it can answer favorably to the request message received, in a step E4. The attack affecting the resources of the client domain 11 is then mitigated conventionally (either directly by the server S12 or by interfacing with an external entity such as a mitigator).

If during step E3, the mitigation server S12 determines that it is not able to process the "Request Mitigation" request message because, in the particular implementation considered here, it is not authorized to manage the resource targeted by the attack (identified for example by the "target-prefix", "target-uri", "target-fqdn" fields, etc., of the body of the message), then the mitigation server S12 seeks to identify another mitigation server authorized to process the request message. To this end, the mitigation server S12 seeks to obtain at least one DADI associated with the client domain 11 to which the client node C1 issuer of the request message during a step E5 belongs.

At this stage, two situations appear: a first situation wherein the "Request Mitigation" request message does not comprise any DADI associated with the client domain 11, and a second situation (case considered in the example here) wherein the "Request Mitigation" request message comprises at least one DADI associated with the client domain 11 (in its message body, in one of its header fields, or in a transmission option such as a UDP option as previously described).

In the first situation, the server S12 then determines a domain name associated with the client domain 11. To this end, it extracts for example, a domain name associated with the client domain 11 included, for example, in the certificate used to create the (D) TLS association required beforehand to send the "Request Mitigation" request message. Then, it queries by means of the domain name thus obtained, the first DADI registry by sending thereto during a step E6, a SVCB request. The first DADI registry then uses this domain name to obtain at least one DADI, DADI-$11_1$, DADI-$11_2$ and/or DADI-$11_3$, associated with the client domain 11. Once these DADIs, DADI-$11_1$, DADI-$11_2$ and/or DADI-$11_3$ have been obtained, they are sent to the mitigation server S12 by the first DADI registry.

Once in possession of the DADI(s) DADI-$11_1$, DADI-$11_2$, DADI-$11_3$ associated with the client domain 11, the server S12, issues, in a step E7, a new request, designated for example here by "QUERY_DPS_REGISTRY", and specifically designed for the needs of the present solution, to the DPS_Active_DADI registry in order to identify at least one mitigation server, authorized to process the "Request Mitigation" request message associated with the identifier(s) obtained. As indicated with reference to Table 2, such a DPS_Active_DADI registry is supplied by the DPS providers of which the DPS implement the present solution.

In the second situation, the server S12 extracts, during a step E8, the DADI(s) present in the "Request Mitigation" request message and verifies that this (these) DADI(s) is (are) indeed associated with the DPS that it contributes to implementing. Such information is for example locally configured at the level of each mitigation server.

If the DPS implemented by the mitigation server S12 does not correspond to a DPS associated with the DADI(s) extracted from the request message, this means that the request message "Request Mitigation" request message has been routed by error to the server S12 because the DPS that it implements is not a DPS retained by the entity managing the client domain 11 to mitigate the attacks against the resources of this client domain indicated in the signaling message.

In this case, the mitigation server S12 issues, in a step E9, a "QUERY_DPS_REGISTRY" request to the DPS_Active_DADI registry in order to identify at least one mitigation server (S13 or S14 in the example of FIG. 1 considered here) authorized to process the "Request Mitigation" request message and associated with the identifier extracted from the request message.

In another example of implementation of the invention, the mitigation server S12 issues a "QUERY_DPS_REGISTRY" request to the DPS_Active_DADI registry in order to identify at least one mitigation server (S13 or S14 in the example of FIG. 1 considered here) authorized and capable of processing the "Request Mitigation" request message, and associated with the identifier extracted from the request message. In this example, it is assumed a real-time publication of the information relating to the various mitigation servers or a querying of the information of the mitigation server in order to determine the ability of the latter to process the request message.

For example, the mitigation server S12 implements the DDOS protection service (DPS1 in the example considered here) that is associated with the DADI, DADI-$11_1$, allocated to the client domain 11. In this example, it is assumed that the DADI extracted from the request message is the identifier DADI-$11_3$. By consulting the DPS_Active_DADI registry, the mitigation server S12 notes that the DADI, DADI-$11_3$ does not correspond to the DADI, DADI-$11_1$, associated with the DPS1 service that it implements. The mitigation server S12 then queries the DPS_Active_DADI registry in order to identify, by means of the identifier DADI-$11_3$ extracted from the request message, a mitigation server associated with the identifier DADI-$11_3$. Data relating to the mitigation server in question (S14 in the illustrative example considered here) is obtained during this step.

In the scenario where the DADI extracted by the server S12 during the step E8 is indeed associated with the DPS of the mitigation server S12 and where the mitigation server S12 is not authorized to process the request message, this means, in the embodiment described here, that the same DADI is used by a plurality of DPS (case not shown in Table 2).

Indeed, in this situation, the DADI extracted by the server S12 during step E8 identifies DPS responsible for protecting the client domain 11; however, the server S12 although authorized to protect certain resources of the client domain 11 (e.g., 1.2.3.4/32), is not authorized to protect other resources (e.g., 11.12.13.14/32) at the origin of the request message.

In this case, in the embodiment described here, the mitigation server S12 uses the domain name of the client domain 11 that is found for example in the certificate used to create the (D) TLS association required beforehand in order to send the "Request Mitigation" request message as previously described, in order to issue, in a step E10, a SVCB request to the first DADI registry in order to obtain the DADI(s) associated with the client domain 11.

Upon receipt of the DADI(s) associated with the client domain 11, the server S12, subsequently issues, in a step E11, a "QUERY_DPS_REGISTRY" request to the DPS_Active_DADI registry in order to identify at least one mitigation server authorized to process the "Request Mitigation" request message.

For example, the mitigation server S12 contributes to implementing a DDOS protection service that is associated with the DADI, DADI-$11_1$, associated with the client domain 11. The DADI extracted from the request message is the identifier DADI-$11_1$. The mitigation server S12 notes that the DADI extracted from the request message, DADI-$11_1$, corresponds to the DPS that it implements although it is unable to process this request message.

The mitigation server S12 then queries the first DADI registry in order to identify the client domain 11 associated with the identifier DADI-$11_1$ extracted from the request message received. The mitigation server obtains from the first DADI registry that the identifier DADI-$11_1$ is associated with the client domain 11. The mitigation server S12 also obtains the information according to which the client domain 11 is further associated to the identifiers DADI-$11_3$ and DADI-$11_2$.

The mitigation server S12 subsequently queries the DPS_Active_DADI registry in order to identify, by means of the identifier DADI-$11_1$ extracted from the request message and if applicable, the identifiers DADI-$11_3$ and DADI-$11_2$ obtained by querying the DADI registry, another mitigation server contributing to implementing here a DPS different from the DPS implemented by the mitigation server S12 but that is also associated with the identifier DADI-$11_1$ extracted from the request message, or with another identifier DADI-$11_3$ or DADI-$11_2$ associated with a DDOS protection service protecting the resources of the client domain 11.

In an alternative embodiment, the mitigation server S12 queries the DPS_Active_DADI registry in order to identify, by means of the identifier DADI-$11_1$ extracted from the request message only another mitigation server contributing to implementing a DPS different from the DPS implemented by the mitigation server S12 but that is also associated with the identifier DADI-$11_1$ extracted from the request message.

The implementation of one or other of the alternative embodiments may depend on possible agreements made between the client domain and the DPS, or mutually between the DPS, etc.

More particularly, the mitigation server S12 can obtain the information for locating mitigation servers authorized and likely to answer the initial mitigation request. The transmission of all or part of the information identifying the DPS providers that operate said mitigation servers with the mitigation server S12 may be influenced by the existence of agreements made between the various DPS providers. Thus, the mitigation server S12 may only have access to the contact information of partner DPS providers, according to the DADIs associated with their clients, and that figure in the DPS_Active_DADI registry.

In response to a "QUERY_DPS_REGISTRY" request, regardless of whether it has been issued during step E7, E9 or E11, the mitigation server S12 receives, during a step E12, a message coming from the DPS_Active_DADI registry.

Such a message returns a set of DPS_Contact_Point parameters (that is to say information) associated with one or more mitigation servers a priori authorized to process the request message. As specified above, such a set of DPS_Contact_Point parameters may comprise information for identifying a mitigation server such as a domain name, information for locating this mitigation server (e.g., an IP address, a port number), and other information such as the validity period of the record, etc. relating to the DPS that is associated with it.

Thus, the mitigation server S12 contacts the DPS_Active_DADI registry to retrieve the contact point(s) (mitigation servers) of the DPS authorized to process the mitigation request according to the values of the DADIs. The response of the registry may consist in transmitting all or part of the DPS contact points, depending on whether or not agreements have been made between the various DPS providers.

Thus, by way of example, the mitigation server S12 can only obtain DPS_Contact_Point information associated with mitigation servers implementing the same DPS, regardless of the location of these mitigation servers.

In another example, the mitigation server S12 can only obtain DPS_Contact_Point information associated with mitigation servers located in the same server domain but having different resources, etc.

Following the receipt of this message comprising the DPS_Contact_Point information, the mitigation server S12 may undertake at least two actions. Such a choice of an action to be undertaken is made for example based on attack traffic processing policies that are provided to it by the provider of the mitigation services that it operates.

Thus, a first action consists in requesting a redirection of the "Request Mitigation" request message to another mitigation server, identified by a set of DPS_Contact_Point parameters present in the message received during step E12.

For this, the mitigation server S12 issues, in a step E13, a redirection message to the client node C1, this redirection message comprises information making it possible for the client node C1 to identify (and if applicable locate) the mitigation server to which it must re-issue the request message. An example of the body of such a redirection message is provided below:

```
{
"ietf-dots-signal-channel:redirected-signal": [
    {
        "alt-server": "dps-contact-point1.name ",
        "alt-server-record": [
        "2001:db8:6401::1",
        "2001:db8:6401::2"
        ]
    },
    {
        "alt-server": "dps-contact-point2.name",
        "alt-server-record": [
            "2001:db8:3000::1",
            "2001:db8:3000::2"
        ]
    }
    ]
}
```

Such a message comprises a list of alternative mitigation servers to which the request message can be re-issued, corresponding to the sets of DPS_Contact_Point parameters received by the mitigation server S12. These mitigation servers are identified in the "alt-server" attributes of said redirection message. According to the policies adopted, this redirection message can be transmitted at the same time to all the mitigation servers identified in the list or according to a predefined order.

Upon receipt of this redirection message, the client node C1 re-issues in step E14, the "Request Mitigation" request message to the mitigation server(s) identified in the redirection message, for example to the mitigation server S14. If a plurality of mitigation servers are identified in the redirection message, the request message may be sent to these servers at the same time or in sequence.

Upon receipt of the request message issued by the client node C1 during step E14, the mitigation server S14 implements, in turn, steps E3 to E15 described previously.

This will be the case until a mitigation server able to process the request message is identified.

A second action consists, for the mitigation server S12, in relaying, in a step E15, the "Request Mitigation" request message to the mitigation server(s) identified during step E12.

Upon receipt of the request message relayed by the mitigation server S12 during step E15, the mitigation server identified implements, in turn, steps E3 to E15 described previously.

This will be the case until a mitigation server able to process the request message thus relayed from mitigation server as mitigation server is identified.

When a mitigation server able to process the request message is identified, the attack affecting the resources of the client domain 11 can then be mitigated conventionally (directly by the server in question or by interfacing with an external entity such as a mitigator).

It is noted that in the example considered here, the mitigation server S12 has sought to identify, in order to process the request message, a mitigation server implementing a different DPS. However, in an alternative embodiment, it can be considered that it identifies another mitigation server authorized to process the request message and implementing the same service. In this alternative embodiment, it is however recommended to establish mechanisms making it possible to prevent, during a recursive implementation of the identification method according to the invention, a loop from being created by requesting several times the same mitigation server unable to process the request message. Such a loop can be prevented for example, by ensuring that the mitigation server having relayed the request message is excluded from the list of mitigation servers to which the request message may be routed in order to be relayed.

In relation to FIG. 3, the simplified structure of a client node C1, C2, C3, Cm according to one of the embodiments described above is presented.

According to a particular embodiment, a client node C1, C2, C3, Cm comprises a memory $101_C$ comprising a buffer memory, a processing unit $102_C$, equipped for example with a programmable computing machine or with a dedicated computing machine, for example a processor P, and controlled by the computer program $103_C$, implementing steps of the methods for identifying at least one server for mitigating and protecting a client domain against a computer attack according to one embodiment of the invention.

Upon initialization, the code instructions of the computer program $103_C$ are for example loaded into a RAM memory before being executed by the processor of the processing unit $102_C$.

The processor of the processing unit $102_C$ implements steps of the method for identifying at least one server for mitigating and protecting a client domain against a computer attack previously described, according to the instructions of the computer program $103_C$, for:

transmitting a message to request support for the management of attacks to a first attack mitigation server;

receiving at least one information for identifying at least one second attack mitigation server authorized to process said request message, the first and the second attack mitigation server being associated with distinct DDOS protection services; and transmitting said request message to said second mitigation server.

In relation to FIG. 4, the simplified structure of a mitigation server S12, S13, S14 according to one of the embodiments described above is presented.

For example, a mitigation server S12, S13, S14 comprises a memory $111_{S,C}$ comprising a buffer memory, a processing unit $112_{S,C}$, equipped for example with a programmable computing machine or with a dedicated computing machine, for example a processor P, and controlled by the computer program $113_{S,C}$, implementing steps of the methods for identifying at least one server for mitigating and protecting a client domain against a computer attack according to one embodiment of the invention.

Upon initialization, the code instructions of the computer program $113_{S,C}$ are for example loaded into the RAM memory before being executed by the processor of the processing unit 112S.

The processor of the processing unit $112_{S,C}$ implements steps of the methods previously described, according to the instructions of the computer program $113_{S,C}$, for:

receiving a message to request support for the management of attacks coming from a client node of the client domain; and when said mitigation server, known as first mitigation server, is unable to process said request message:

obtaining, by means of an identifier of said client domain obtained by the first mitigation server, at least one information for identifying at least one second attack mitigation server authorized to process said request message.

The invention claimed is:

1. A method for identifying at least one attack mitigation server authorized to protect a client domain against a computer attack, said method being implemented by a first attack mitigation server and comprising:

receiving a message to request support for management of attacks coming from a client node of the client domain; and in response to said first mitigation server being unable to process said request message:

obtaining, by using one at least first identifier of said client domain obtained by the first mitigation server, at least one information for identifying at least one second attack mitigation server authorized to process said request message.

2. The method for identifying at least one mitigation server according to claim 1 wherein the at least one said first identifier of said client domain is obtained by querying a first database by using a domain name associated with said client domain.

3. The method of identifying at least one mitigation server according to claim 1 wherein the at least one said first identifier of said client domain obtained is extracted from said request message.

4. The method for identifying at least one mitigation server according to claim 1, wherein the at least one said first identifier of said client domain is obtained by using a second identifier of said client domain extracted from the request message.

5. The method for identifying at least one mitigation server according to claim 4 wherein the at least one first identifier of said client domain is obtained by using a domain name of said client domain associated with said second identifier of said client domain.

6. The method for identifying at least one mitigation server according to claim 1, comprising obtaining at least one information for locating said second mitigation server by querying a second database by using said first identifier of said client domain.

7. The method for identifying at least one mitigation server according to claim 1, wherein said at least one information for identifying said second mitigation server comprises at least one domain name of a domain associated with said second mitigation server.

8. The method for identifying at least one mitigation server according to claim 6, wherein said at least one information for locating said second mitigation server comprises at least one network address of said second mitigation server and/or at least one port number of said second mitigation server.

9. The method for identifying at least one mitigation server according to claim 1, further comprising transmitting, to said client node, said information for identifying and/or locating said second mitigation server.

10. The method for identifying at least one mitigation server according to claim 1, further comprising transmitting, to said second mitigation server, said request message.

11. A method for protecting a client domain against a computer attack, said method being implemented by a client node hosted by the client domain and comprising:

transmitting a message to request support for management of attacks to a first attack mitigation server, said request message comprising at least one identifier of said client domain; and receiving at least one identification information, obtained by said first mitigation server by using said at least one identifier, at least one attack second mitigation server authorized to process said request message, the first and the second attack mitigation server being associated with distinct mitigation services; and transmitting said request message to said second mitigation server.

12. A first mitigation server, authorized to protect a client domain against a computer attack, and comprising:

at least one processor configured to:

receive a message to request support for management of attacks coming from a client node of the client domain; and in response to said first mitigation server being unable to process said request message:

obtain, by using an identifier of said client domain obtained by the first mitigation server, at least one information for identifying at least one second attack mitigation server authorized to process said request message.

13. A client node hosted by a client domain comprising:

at least one processor configured to:

transmit a message to request support for the management of attacks to a first attack mitigation server, said request message comprising at least one identifier of said client domain;

receive at least one information for identifying, obtained by said first mitigation server by using said at least one identifier, at least one attack second mitigation server authorized to process said request message, the first and the second attack mitigation server being associated with distinct mitigation services; and transmit said request message to said second mitigation server.

* * * * *